(No Model.)  8 Sheets—Sheet 2.

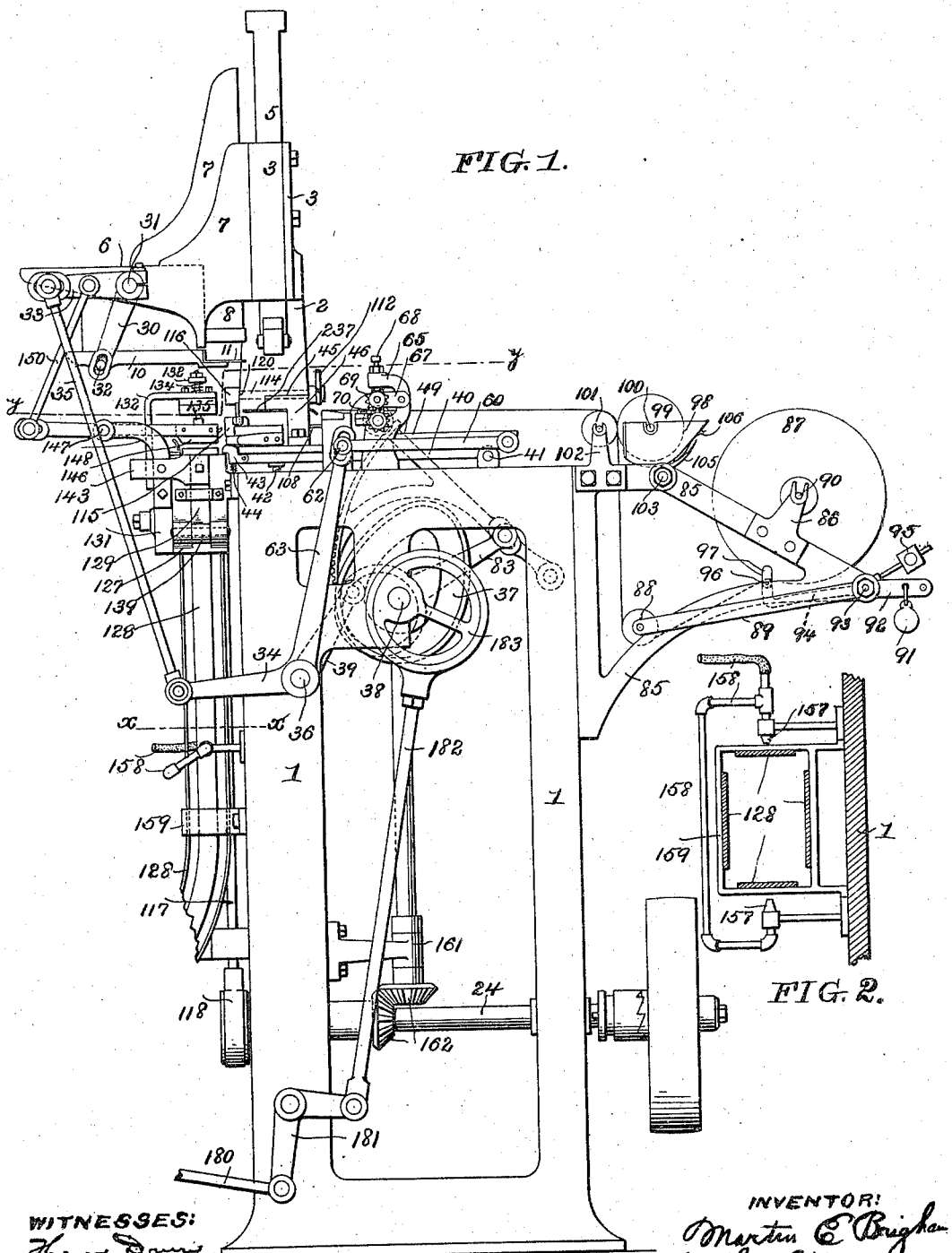

M. E. BRIGHAM.
WRAPPING AND LABELING MACHINE.

No. 575,325.  Patented Jan. 19, 1897.

WITNESSES:  INVENTOR:
  Martin E. Brigham
  By his Atty.

(No Model.) 8 Sheets—Sheet 3.
M. E. BRIGHAM.
WRAPPING AND LABELING MACHINE.
No. 575,325. Patented Jan. 19, 1897.
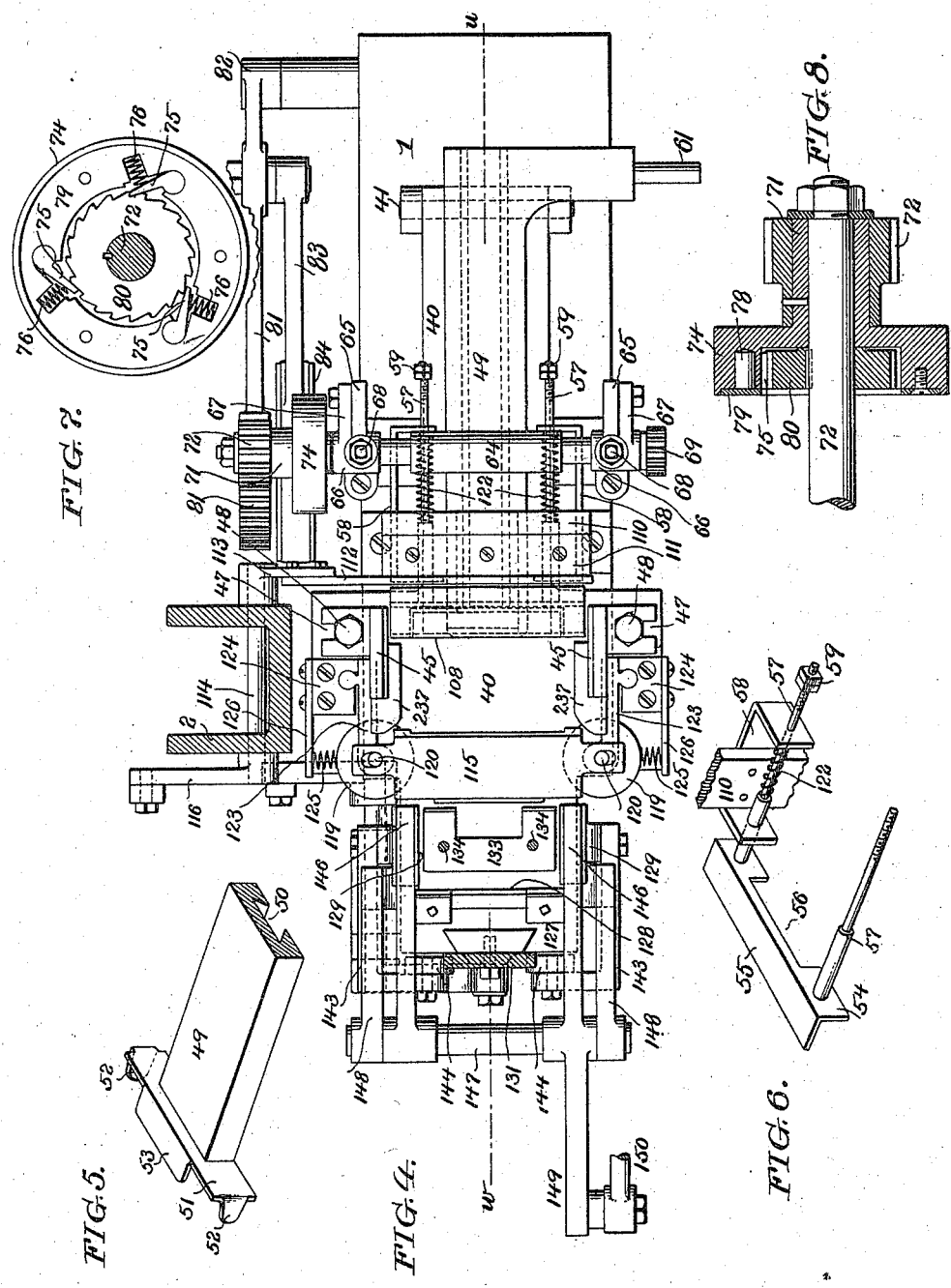
WITNESSES: INVENTOR:

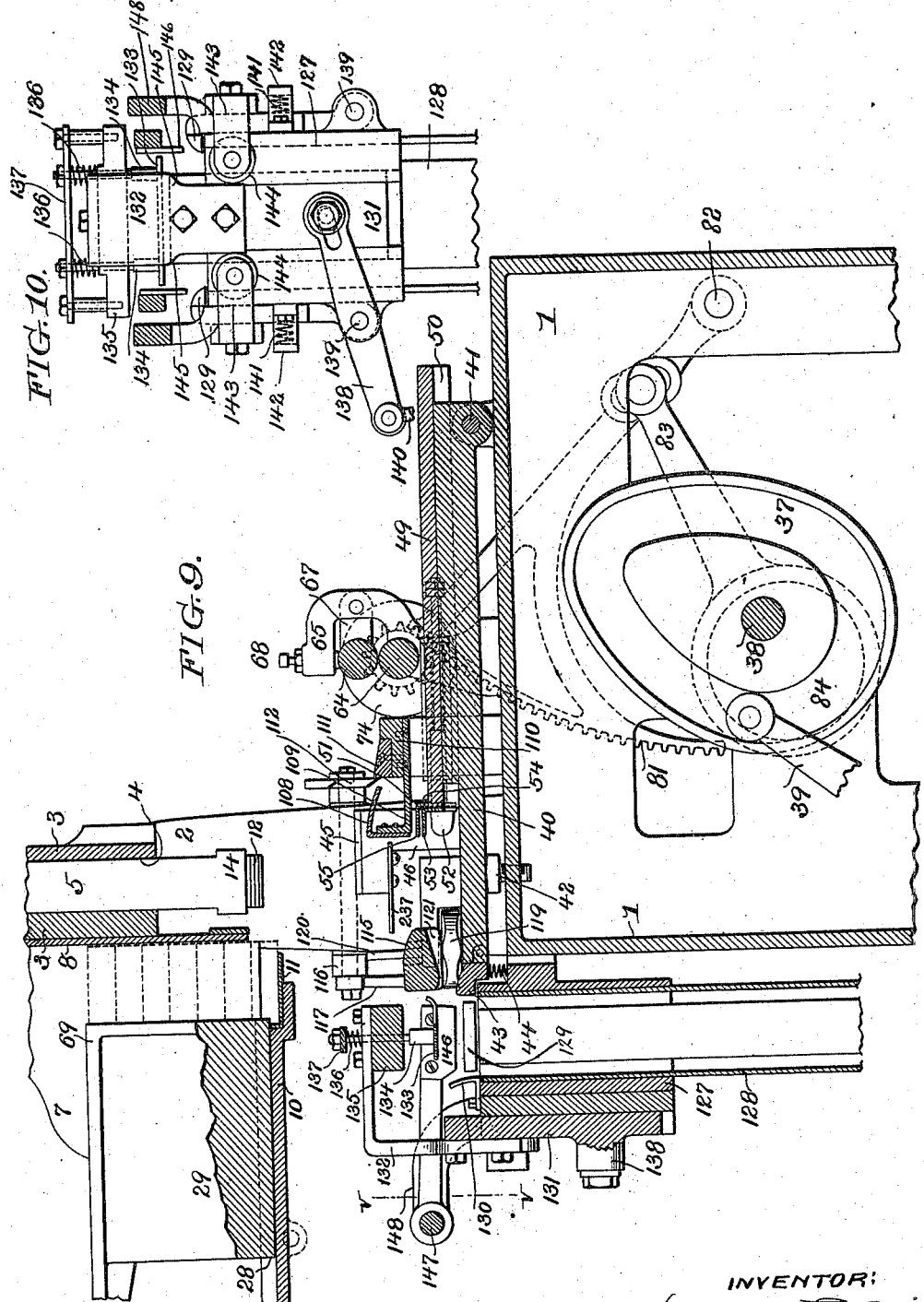

(No Model.) 8 Sheets—Sheet 5.
M. E. BRIGHAM.
WRAPPING AND LABELING MACHINE.
No. 575,325. Patented Jan. 19, 1897.
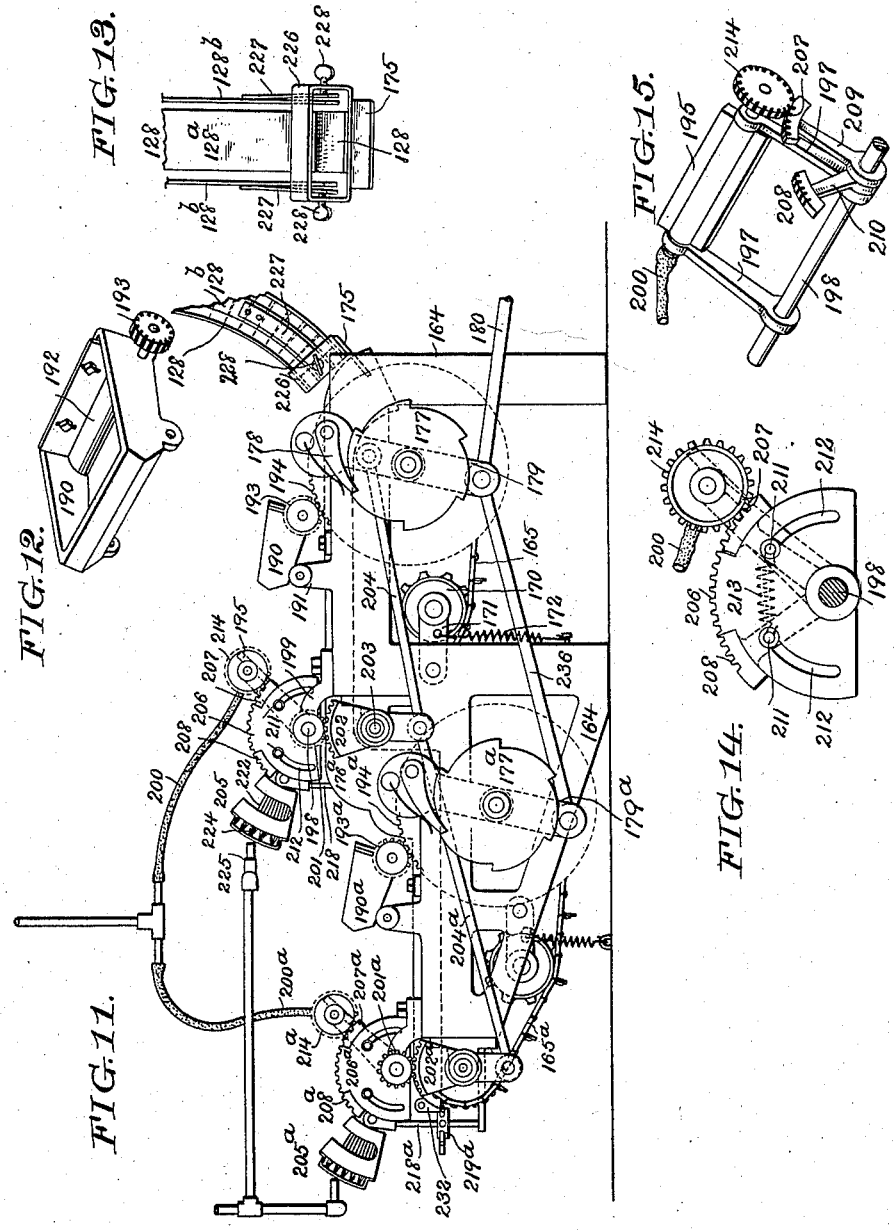
WITNESSES:
INVENTOR:
Martin E. Brigham
By his Atty.

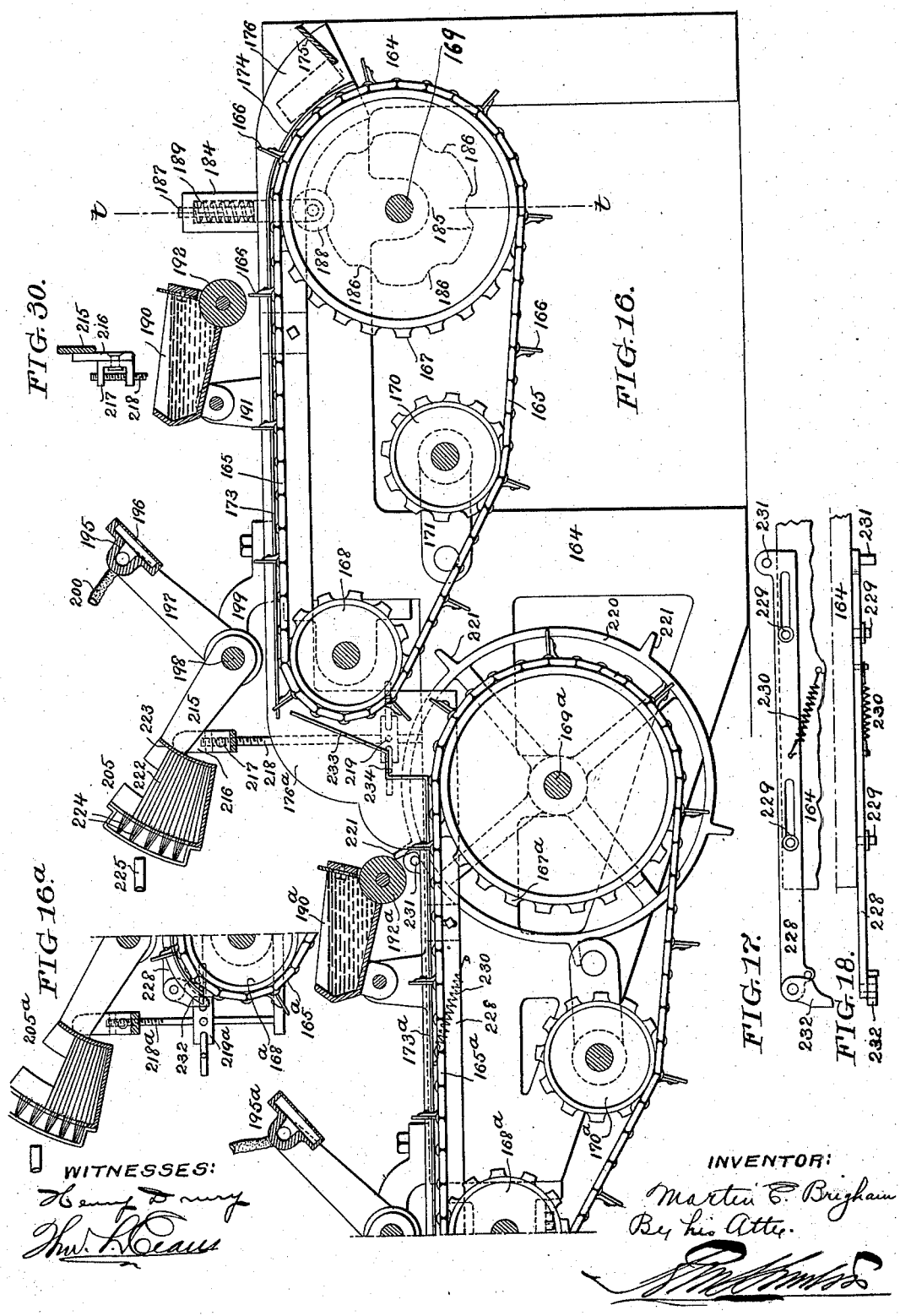

(No Model.) 8 Sheets—Sheet 7.

M. E. BRIGHAM.
WRAPPING AND LABELING MACHINE.

No. 575,325. Patented Jan. 19, 1897.

WITNESSES:

INVENTOR:
Martin E. Brigham
By his Atty.

(No Model.) 8 Sheets—Sheet 8.
M. E. BRIGHAM.
WRAPPING AND LABELING MACHINE.
No. 575,325. Patented Jan. 19, 1897.
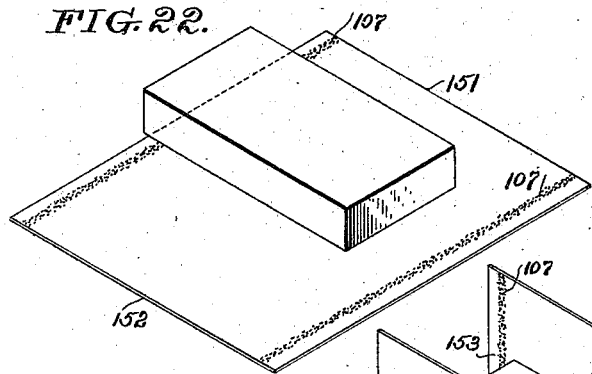
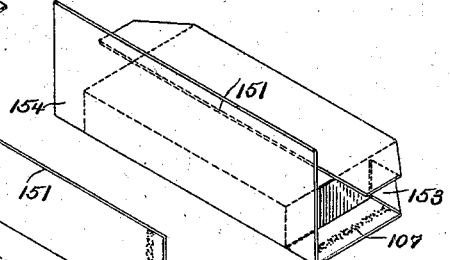
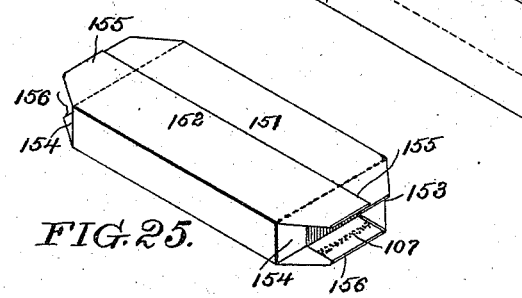
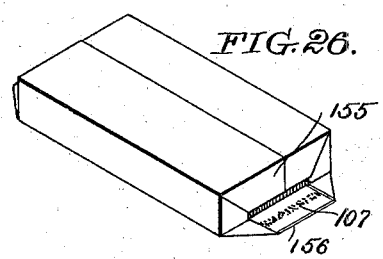
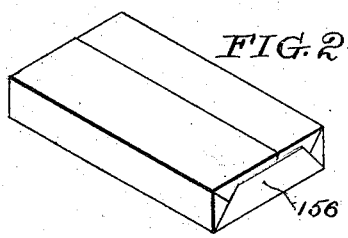
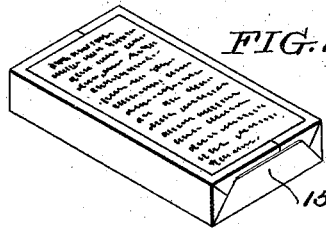
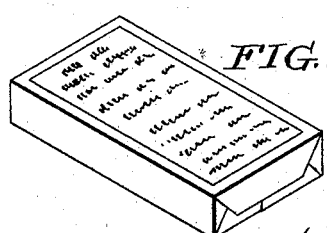
WITNESSES:
INVENTOR:
Martin E. Brigham
By his Atty.

UNITED STATES PATENT OFFICE.

MARTIN E. BRIGHAM, OF PHILADELPHIA, PENNSYLVANIA.

WRAPPING AND LABELING MACHINE.

SPECIFICATION forming part of Letters Patent No. 575,325, dated January 19, 1897.

Application filed August 17, 1895. Serial No. 559,605. (No model.)

*To all whom it may concern:*

Be it known that I, MARTIN E. BRIGHAM, of the city and county of Philadelphia, State of Pennsylvania, have invented an Improvement in Wrapping and Labeling Machines, of which the following is a specification.

My invention relates to machines for wrapping and labeling packages; and it consists of certain improvements, which are fully set forth in the following specification and are shown in the accompanying drawings.

My machine as an entirety is adapted to automatically take the cakes or articles to be wrapped one at a time from a support or magazine, deposit them upon the wrapper, which is automatically fed and cut from a roll of paper, paste and fold the wrapper about the article, then apply a label to one face of the wrapped package, and finally turn the package over and apply a label to its other face. All of these operations take place automatically, so that neither the article nor wrapper need receive any hand manipulation during the wrapping and labeling operations.

It is of course not essential to my invention that all of these devices should be employed together, although I have shown them embodied in a single organized machine adapted to automatically perform the entire operation of wrapping and double-labeling.

A part of my improvements relates to the devices for folding the wrappers about the articles.

Another part of my improvements relates to the devices for applying the labels to the packages.

My invention also includes various improvements in construction and combinations of parts, which are fully set forth and claimed hereinafter.

I shall now refer to the accompanying drawings.

Figure 3:
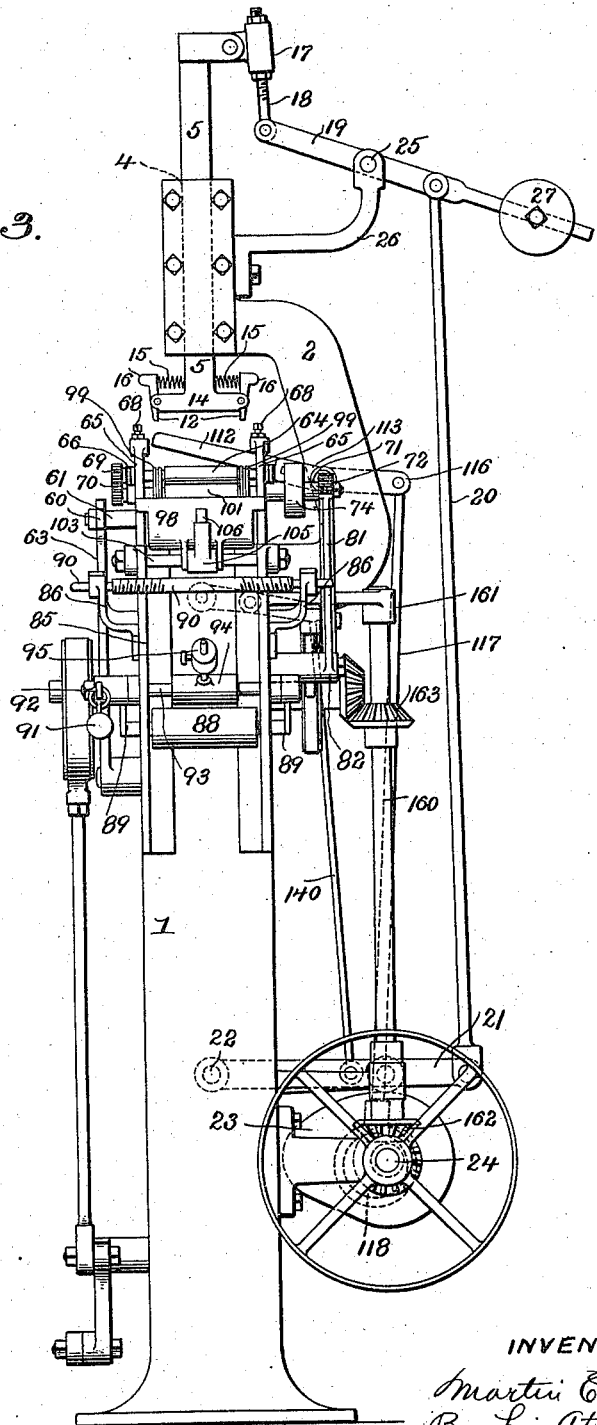
Figure 20:
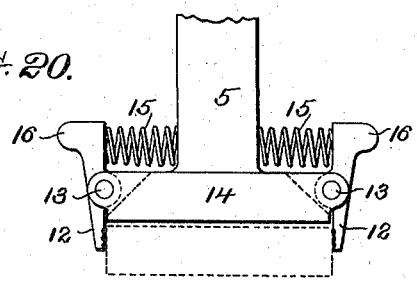
Figure 21:
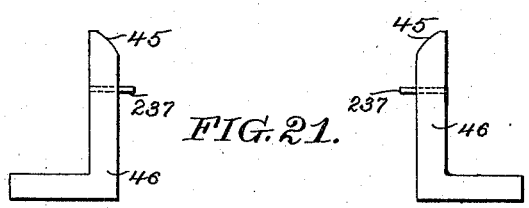
Figure 19:
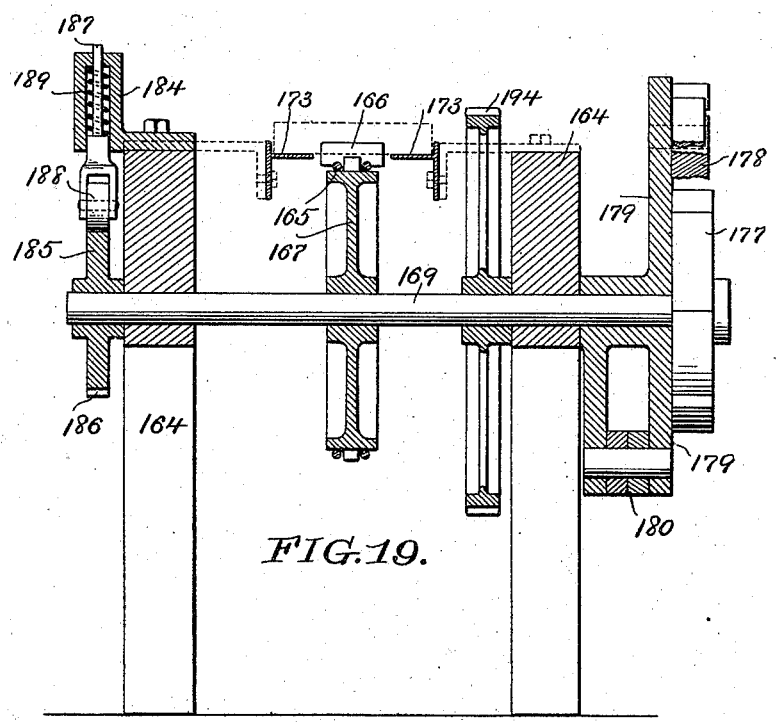

Figure 1 is a side elevation of a portion of a machine embodying my improvements and showing the wrapping-machine. Fig. 2 is an enlarged horizontal sectional view of the same on the line $x\ x$ of Fig. 1 through the guideway for the wrapped packages. Fig. 3 is a front elevation of the machine. Fig. 4 is a horizontal plan view of the body of the portion of the machine shown in Fig. 1, taken on line $y\ y$ of Fig. 1. Fig. 5 is an enlarged perspective view of one of the folding-frames. Fig. 6 is a similar enlarged view of the auxiliary folding-frame. Fig. 7 is an end elevation, enlarged, of the driving mechanism of the wrapper-feeding rollers. Fig. 8 is a longitudinal sectional view of the same on the line $z\ z$ of Fig. 7. Fig. 9 is a longitudinal vertical sectional view on the line $w\ w$ of Fig. 4. Fig. 10 is an end elevation of the final-folding devices with part in section on the line $v\ v$ of Fig. 9. Fig. 11 is a side elevation of a portion of the machine, showing the labeling mechanism and forming a continuation of Fig. 1. Fig. 12 is a perspective view of the paste-pot of the labeling mechanism. Fig. 13 is a front view of the end of the guideway for the wrapped packages. Fig. 14 is a side elevation, enlarged, of the devices for turning the label-carrier. Fig. 15 is a perspective view of a portion of the frame. Figs. 16 and 16ª together show an enlarged longitudinal vertical sectional view of the labeling mechanism. Fig. 17 is a plan view of devices for operating the feeding mechanism of the second or auxiliary labeling devices. Fig. 18 is a plan view of the same. Fig. 19 is a transverse vertical sectional view on the line of Fig. 16. Fig. 20 is an enlarged front view of the cake-carrying plunger. Fig. 21 is an enlarged side elevation of the stops for operating the jaws of the cake-carrying plunger. Figs. 22 to 29, inclusive, are perspective views illustrating the different stops in the operations of wrapping the cake and labeling the packages. Fig. 30 is a vertical sectional view, enlarged, of part of the feeding devices of the label-holder.

I shall now describe in detail the construction, combination, and mode of operation of the various mechanisms shown in the drawings, and for the purpose of simplifying the description I have divided the description into four parts: the feeding mechanism for feeding the articles to be wrapped, the wrapper-feeding mechanism for feeding the paper and cutting the wrappers, the wrapper-folding mechanism for folding the wrapper about the article to form the wrapped package, and labeling devices for applying the labels to the packages.

The Cake-Feeding Mechanism.

1 is the frame of the machine.

2 is an upwardly-extending bracket carried by the frame 1. Carried by the bracket 2 are frames 3, forming a vertical guide 4 for the feeding-plunger 5, which reciprocates therein. Also carried by the bracket 2 is a frame 6, provided with side cheeks 7 7, which, with the front piece 8, form a guideway 9 for the cakes or articles to be wrapped.

10 is a reciprocating pusher adapted to receive the articles from the guideway 9 and push them one at a time to the feeding-plunger. The front end of the pusher 10 is preferably provided with an angular finger 11, adapted to support the articles to be wrapped. When the pusher 10 is retracted, as shown in Fig. 1, the lowermost cake will rest on the finger 11.

The plunger 5 is provided on its end with gripping jaws or fingers 12 12, adapted to receive and hold the article. These jaws are preferably pivoted, as at 13, to the head 14 of the plunger and are acted upon by springs 15 15, tending to throw their lower or gripping ends inward, so as to grasp the article. The gripping-jaws may be provided with roughened faces to more effectually seize and hold the article.

16 are projections on the upper ends of the jaws 12, by means of which the jaws are actuated to release the article at the proper moment, as is explained hereinafter.

The plunger may be reciprocated in any suitable manner. For this purpose I have shown the upper end of the plunger connected by a hinged sleeve 17 and adjustable link 18 with a rocking lever 19, operated through a rod 20 from a lever 21 in the lower part of the machine. The lever 21 has its fulcrum at 22 at one end and is operated by a cam 23 on the driving-shaft 24. The lever 19 has its fulcrum at 25 on a bracket 26, carried by the bracket 2, and may be provided on its outer end with a weight 27, by which the parts will be returned to normal position with the plunger 5 lifted.

The pusher 10 is shown guided on ways 28 of a rib 29 of the frame 6 and is operated by an arm 30 on a rock-shaft 31, journaled in the frame 6. The arm 30 is connected with the pusher 10 by a pin and slot 32 to permit the desired movements. The rock-shaft 31 is rocked by a crank 33, operated from a crank-arm 34 through the connection 35. The arm 34 is carried by a rock-shaft 36 in the frame 1, and motion is imparted to the shaft 36 by a grooved cam 37 on the shaft 38 through the arm 39, carried by the shaft 36 and having its end engaging the cam-groove 37. On each forward movement of the pusher 10 one of the articles is taken from the guideway 9 and is pushed between the jaws 12 12 of the plunger 5. The pusher 10 returns, leaving the article held in the jaws 12, and the plunger 5 then descends, carrying the article with it.

40 is a table or bed located over the horizontal top of the main frame 1 and extending below the plane of movement of the plunger 5 to receive and support the article. This table is preferably adjustable, so that it may be raised and lowered. For this purpose I have shown it hinged at one end to the main frame, as at 41, with its other end, upon which the article is received, supported by adjustable supports 42. 43 is a nose-piece hinged to the outer end of the table and projecting slightly above its surface. A spring 44, acting in the nose-piece, retains it in a raised position, but permits it to be depressed. This nose-piece 43 acts to press upward on the bottom of the partially-wrapped package with a yielding pressure.

45 45 are trips or projections arranged above the table 40 and in position to strike the lugs 16 of the jaws 12 when the plunger 5 descends. These trips rock the jaws 12 12 and cause them to release the cake which they carry. I have shown the trips 45, carried by brackets 46, on the table 40. The brackets 46 may be adjusted laterally by the slots 47 and screws 48.

The Wrapper-Feeding Mechanism.

64 64 are feeding-rollers extending transversely above the table 40 in front of the plunger 5 and having their shafts journaled in suitable bearings carried in brackets 65, mounted on the main frame 1. To enable the pressure of the upper roller upon the lower one to be adjusted, I prefer to mount the bearings 66 of the shaft of the upper roller in arms 67, pivoted to the brackets 65. By means of adjusting-screws 68, carried by the brackets 65 and bearing on the bearings 66, the pressure of the upper roller 64 on the lower one may be regulated.

69 and 70 are gears on the ends of the shafts of the upper and lower rollers 64 64, respectively, and meshing together, so that the two rollers will be driven.

To feed the paper intermittently, an interrupted motion is imparted to the shaft of one of the rollers. For this purpose I prefer to employ the following mechanism: 64 64 are feeding-rollers extending transversely above the table 40 in front of the plunger 5, and having their shafts journaled in suitable bearings carried in brackets 65, mounted on the main frame 1. To enable the pressure of the upper roller upon the lower one to be adjusted, I prefer to mount the bearings 66 of the shaft of the upper roller in arms 67, pivoted to the brackets 65. By means of adjusting-screws 68, carried by the brackets 65 and bearing on the bearings 66, the pressure of the upper roller 64 on the lower one may be regulated. 69 and 70 are gears on the ends of the shafts of the upper and lower rollers 64 64, respectively, and meshing together, so that the two rollers will be driven.

To feed the paper intermittently, an interrupted motion is imparted to the shaft of one of the rollers. For this purpose I prefer to employ the following mechanism: 71 is a sleeve loosely mounted on the shaft 72 of the lower roller 64. 73 is a pinion fast on the sleeve 71. 74 is a disk on the sleeve 71, embracing the shaft 72 and carrying pawls 75, pressed outwardly by springs 76. I have shown the pawls provided with short journals 78, seated in cavities in the disk 74 and retained therein by an annular plate 79, fastened to the face of the disk. 80 is a ratchet fast on the shaft 72 and adapted to be engaged by the pawls 75. When the sleeve 71 is rotated in one direction, the shaft 72 will be driven through the pawls 75 and ratchet 80. The sleeve 71 will turn in the opposite direction without driving the shaft 72. 81 is a rocking toothed segment meshing with the pinion 73 and driving it alternately in opposite directions. The segment 81 is pivoted at 82 to the main frame and is rocked by an eccentric-rod 83, actuated by an eccentric 84 on the shaft 38. By this apparatus a uniform intermittent forward or feeding motion is imparted to the feeding-rollers 64 64.

85 is a bracket in the front of the machine provided with supports 86 for the axis 90 of the roll of paper 87.

88 is a tension-roller under which the paper passes as it travels in the web from the roll. This tension-roller is carried by pivoted levers 89, which may be provided with an adjustable weight 91 (shown on an arm 92, carried by one the levers) to regulate the tension. The levers 89 are shown fulcrumed on a shaft 93 in the front of the bracket.

94 is a rocking frame sleeved on the shaft 93 and having its outer end bearing against the roll 87. A weight 95, acting on the frame 94, holds it in contact with the surface of the roll. The frame 94 is shown provided with a small roller 96, (dotted lines in Fig. 1,) where it makes contact with the surface of the paper, and with projections 97 on its ends embracing the edge of roll, so as to guide the paper as it is drawn off.

98 is a paste-pot mounted on the front of the machine, in which are located two pasting-disks 99 99, carried on a shaft 100, journaled in the pot.

101 is an idler having its shaft journaled in standards 102 adjacent to the paste-pot. The pasting-disks 99 99 run in contact with the idler 101, and to press the disks against the idler with a yielding pressure the pot 98 may be spring-pressed toward the idler 101. I have shown the pot hinged to a cross-shaft 103 in the bracket 85, and a spring 106 interposed between the pot and an arm 105 on the shaft.

The paper in the web passes from the roll 87 under the tension-roller 88, then between the idler 101 and the pasting-disks 99, and finally between the feeding-rollers 64 64, by the positive action of which the paper is drawn from the roll 87 and fed forward under the plunger 5 and over the table 40. The movement of the paper between the roller 101 and disks 99 imparts a rotary movement to the disks, and the paste is thereby applied to the paper adjacent to each end, as shown at 107 in Fig. 22 *et seq.* The rollers 64 64 are shorter than the width of the paper, so that they will not come in contact with the lines of paste.

108 is a bridge-piece located behind the rollers 64 64 and supports the paper at one end, as shown in Fig. 9. I have shown this bridge-piece carried by a bracket 109, extending from a frame 110, carried by the main frame 1 and extending over the table 40 and slide 49.

The outer end of the paper is sustained by a frame 115, located opposite the bridge 108 and preferably slightly lower, as shown in Fig. 9. The sides of the paper may be sustained by projections 237 237, carried by the brackets 46.

As the paper is fed forward by the rollers 64 64 it passes between the cutters, by which the end is cut off at proper length to form a single wrapper. 111 is the stationary blade or dead-knife of the cutter and is carried by the frame 110.

112 is a rocking cutter acting in conjunction with the knife 111 to cut the paper. This cutter is carried by a rocking arm 113 on the end of a rock-shaft 114, journaled in a suitable bracket, as in the bracket 2. The paper is fed by the rollers 64 64 between the cutters 111 and 112 when the cutter 112 is raised, and when the feeding movement of the rollers ceases the cutter 112 descends and cuts off the wrapper.

The cutter 112 may be operated in any suitable manner. For this purpose I have shown the shaft 114, provided with an arm 116, connected with an eccentric-rod 117, operated by an eccentric 118 on the shaft 24.

*The Wrapper-Folding Mechanism.*

49 is a longitudinally-reciprocating frame guided by ways 50 on the table 40. On the end of the frame is transverse plate 51, provided on its ends with forwardly-projecting folding-fingers 52 52 and with a horizontal projection 53, extending forward from its upper edge.

54 is an independent plate notched, as at 56, so as to fit over the frame 49 and occupy a position in the rear of the plate 51.

55 is a folding projection extending forward from the upper edge of the plate 54 and lying over the projection 53 of the plate 51. The plate 54 is thrown forward by springs 122, so that when the plate 51 moves forward the plate 54 will move with it under the action of the springs 122. I have shown the plate 54, provided with rods 57, guided on brackets 58, carried by the frame 110, with the springs 122 interposed between a shoulder on the rods 57 and the bracket 58.

59 are adjustable nuts or stops on the rods 57, by which the forward movement is limited.

Suitable mechanism may be employed for reciprocating the frame 49. For this purpose I have shown the frame 49 connected with a hinged arm 60 on a pin 61 on the rear of the frame, which is connected by a pin-and-slot connection 62 with a rocking arm 63 of the rock-shaft 36.

119 119 are disks on upright axes 120 on the outer end of the table 40 and a distance apart substantially equal to the length of the article which is fed between them. I prefer to form the peripheries of these disks 119 119 with tapered faces, as shown, which enable them to more perfectly form the end folds on the wrapper.

The frame 115, which, as has been stated, may be also used to support the outer end of the wrapper, is a plate extending transversely across the outer end of the table 40 and loosely supported at its ends. I have shown the plate supported by its ends by the axes 120 of the disks 119. This plate is supported at such a height above the table 40 that the cake may be pushed under it, the plate by its weight exerting a slight pressure on the partially-wrapped package. The front edge of the plate may be beveled, as shown at 121.

To permit slight lateral play to the disks 119, so that they will press on the ends of the cake and wrapper with a yielding pressure, I prefer to support their axes in yielding supports 123, pivoted in plates 124 on the sides of the table 40.

125 are springs interposed between the disks 119 and arms 126 of the plates 124.

127 is a frame carried by the main frame 1 in the rear adjacent to the end of the table 40.

128 is a guideway or chute extending down through the frame 127 and preferably consisting of four metal strips, as shown. At the front of the guideway is a gage or stop 130.

131 is a reciprocating slide guided in ways in the rear of the frame 127.

132 is an upwardly-extending arm carried by the slide 131 and having its upper end projecting over the open top of the guideway 128.

133 is a plate carried by the projecting end of the arm 132 and adapted, when the arm is depressed, to act on the wrapped package and press it into the guideway. As it is desirable that this plate should be permitted to yield to some extent, I prefer to support it by a pin or pins 134, projecting up through a frame 135, carried by the arm 132, and bearing against a cross-piece 137, carried by the frame 135, with the pins extending through it.

To reciprocate the slide 131, I have shown a lever 138, having its fulcrum, as at 139, on the frame 127 and connected at one end with the slide and at the other end with a rod 140, which is connected with the cam-actuated lever 21.

129 129 are two dogs pivoted to the frame 127 on each side, as at 139, and having their upper ends projecting slightly over the top of the guideway 128. The dogs are adapted to temporarily support the article and its wrapper, as will be hereinafter explained.

141 are springs located within yokes 142 (see Fig. 10) on the sides of the frame 127 and bearing on the dogs 129 129, so as to normally throw them inward with their noses in position to support the article.

143 143 are arms carried by the dogs 129 and provided with rollers 144. Carried by the slide, as on the arm 132, are cam-faces 145, adapted to act on the rollers 144 and press the dogs outward, so as to release the cake. These cam-faces are so located with reference to the rollers 144 that they will act to operate the dogs immediately after the slide commences to descend.

146 are rocking folders located one on each side over the dogs 129. These folders are carried on a rock-shaft 147, journaled in a bracket 148 of the frame 127 and rocked through the arm 149 and link 150, connected with the crank 33, which operates the pusher 10.

I shall now describe the mode of operation of these devices in wrapping the cake. The wrapper, fed by the rollers 64 64 and cut by the cutters 111 112, rests upon the supports 108 115 and 237 237 at a distance above the table 40. As the plunger 5 descends it deposits the article to be wrapped in the middle of the wrapper and the wrapper is carried down with the article until they rest upon the table. During this operation the article is released by the jaws 12 in the manner described. As the article carries the wrapper down upon the table the two sides 151 152 of the paper are pressed upward by the bridge 108 and the plate 115, respectively, and are thus carried to assume the position shown in Fig. 23. The frame 49 then moves forward, carrying with it the plates 51 and 54, and the long projection 55 of the plate 54 acts upon the upwardly-extending side 151 of the wrapper and flattens it down. At the same time the end-folders 52 of the plate 51 act upon the portions 153 153 of the wrapper and fold them in upon the article. The wrapper is then folded in the manner shown in Fig. 24. The folding-plate 54 has now reached the limit of its movement permitted by the stops 59, and the plate 51 continues to move forward, pushing the partially-wrapped article with it over the table 40. As the article and wrapper are forced under the plate 115 the upwardly-extending piece 152 of the wrapper is flattened down, and at the same time the disks 119 119 act upon the portions 154 154 and fold them in upon the article. The wrapper is then in the partly-folded condition shown in Fig. 25. The article and wrapper have now passed under the plate 115 and between the dogs 129, which enter between the projecting portions 155 156 of the wrapper and retain the article and wrapper above the guideway 128 and below the plate 133. At this moment the folders 146 146 descend and fold down the top and flaps 155, as shown in Fig. 26. At the same time the slide 131 descends, bringing the plate 133 upon the top of the package and retracting the dogs 129. This retraction of the dogs 129 permits the folding of the flaps 155 to be finished by the folders 146 and enables the plate 133 to push the cake into the guideway 128. As the package is thus pushed into the guideway the flaps 156 are pressed up against the ends of the article and the wrapping is completed, as shown in Fig. 27. The wrapped package then falls down through the guideway or chute and is taken up by the conveyer of the labeling devices and the labels are applied.

The object of employing the auxiliary folding-plate 54 to fold down the side 151, instead of relying solely upon the projection 53 of the plate 51, is to permit a plate to be used of substantially the full length of the wrapper, whereby a more perfect fold is obtained and wrinkling is avoided. As the plate 51 is relied upon to carry the article and wrapper to the guideway 128 it must be made short enough to pass between the disks 119, and consequently cannot be of the full width of the wrapper. By employing the auxiliary piece 54, which is not utilized to push the article between the disks 119, I am able to employ a folding projection 55 of the full length of the wrapper and thereby to obtain a more perfect fold. While the use of this auxiliary folding-piece is a feature of my invention to which I lay claim, it is to be understood that I do not mean to limit myself thereto, for it is obvious that the single shorter folder may be used without departing from the invention.

To assist in drying the paste on the wrapper, I find it advantageous to heat the guideway 128. For this purpose I have provided the guideway with burners 157, adjacent to the metal strips which compose it, supplied with gas from a supply-pipe 158.

159 is a frame carried by the main frame of the machine and supporting the guideway 128.

Power may be transmitted from the main shaft 24 to the shaft 38 by an upright shaft 160, journaled in suitable bearings 161 and receiving motion from the shaft 24 through bevel-gears 162 and transmitting it to the shaft 38 through similar bevel-gears 163.

*The Labeling Devices.*

164 is the frame of the labeling mechanism, which is arranged adjacent to the lower portion of the frame 1 immediately below the discharge end of the guideway 128.

165 is a traveling carrier arranged immediately under the end of the guideway 128 and provided with a series of lugs or projections 166.

I have shown the carrier 165 composed of an endless chain passing over the sprocket-wheels 167 168. The sprocket-wheel 167 is carried by a shaft 169, journaled in the frame 164 and suitably driven. The sprocket-wheel 168 is journaled in the rear of the wheel 167 and serves to guide the chain.

170 is a small sprocket-wheel engaging the chain 165 and carried by a pivoted arm 171. A spring 172, acting on the arm 171, forces this sprocket-wheel on the chain and keeps the latter under the proper tension.

173 173 are guide-strips carried by the frames 164 and located one on each side of the chain 165 and extending parallel to its upper portion. These guides act to support and guide the packages while they are carried by the chain 165. The forward portions of these guides, as at 174, are curved downward adjacent to the periphery of the wheel 167.

175 is an inclined guide between the open end of the guideway 128 and the guides 174. The sides of the guides adjacent to the curved portions 174 are preferably enlarged to form side cheeks 176, which, with the guide portions 174 and the guide 175, form a pocket to receive the wrapped package from the guideway 128 and support it until it is taken by the chain 165. An intermittent motion is imparted to the chain 165. For this purpose I have shown the shaft 169 provided with a ratchet 177, operated by a pawl 178 on a rocking lever 179. The lever 179 has its fulcrum on the shaft 169 and is rocked by a connecting-rod 180 from a bell-crank 181 on the frame 1. The bell-crank 181 is operated by an eccentric-rod 182 from an eccentric 183 on the shaft 38. The ratchet is so proportioned that each movement imparted by the pawl 178 will move the chain 165 a sufficient distance to bring a new package under the labeling devices.

185 is a disk mounted on the shaft 169 and provided with a series of depressions 186, corresponding in number with the teeth of the ratchet 177.

187 is a rod carried in a frame 184 on the frame 164 and provided on its end with a roller 188, running on the periphery of the disk 185. The rod 187 is depressed by a spring 189.

The depressions 186 on the periphery of the disk 185 are so located with reference to the rod 187 and the teeth of the ratchet 177 that upon each movement imparted to the shaft through the ratchet a depression 186 will be brought adjacent to the roller 188, which will then enter the depression and act to arrest the shaft and the carrier 165. In this way the stoppage of the carrier at the right moment is assured.

190 is a paste-pot hinged at one end to frames 191 on the frame 164 and provided at its outer end with a pasting-roller 192. On the shaft of this pasting-roller, outside of the pot, is a pinion 193, which meshes with a gear-wheel 194 on the shaft 169. The gear-wheel 194 sustains the paste-pot 190, while permitting it to rise freely, and also rotates the roller 192 to feed the paste. As the package is carried by the conveyer 165 under the roller 192 it raises it and the pot slightly, so that the roller presses upon the face of the package, and thereby a perfect distribution of the paste is obtained.

195 is a hollow suction-box having a perforated face 196. The box 195 is journaled at its ends in a rocking frame consisting of arms 197, carried by a rocking shaft 198, which is journaled in brackets 199 on the frame 164. A suction-tube 200 enters the hollow journal of the box 195 at one end. Suction may be created through the tube 200 by any suitable suction-creating device.

201 is a pinion on the rock-shaft 198, which meshes with a toothed segment 202, pivoted to the main frame 164 at 203. The segment 202 is rocked from the pawl-lever 179, with which it is connected by the rod 204. The segment 202 and pinion 201 rock the shaft 198 and move the suction-box 195 back and forth in an arc to and from the label-holder 205.

206 is a toothed segment carried by the bracket 199 and located in the arc traversed by the box 195. The central portion of this segment is stationary, but on either side are movable sections 207 and 208, which are carried, respectively, on arms 209 and 210, journaled on the shaft 198. These segment-sections 207 and 208, being thus carried by the loose arms 209 and 210, may rock back and forth in the arc of the segment. The arms 209 and 210 are guided in their movements by pins 211, carried by them and engaging slots 212 in the plate of the stationary segment 206. A spring 213, connecting these pins 211, holds the two segmental sections 207 and 208 in normal position adjacent to the stationary portion 206, so as to constitute, substantially, continuations thereof.

214 is a pinion on the journal of the box 195, meshing with the toothed segments 206 207 208. When the box 195 is rocked by the shaft 198 toward the label-holder 205, the pinion 214, traveling in the segments 207 and 206, will be rotated. The box 195 will thus be turned on its axis, and its face 196 will be presented toward the holder 205. When the pinion 214 passes into engagement with the movable section 208, the rotation of the pinion and box 195 ceases, owing to the fact that section 208 is free to rock forward with its arm 210 and is carried forward by the pinion. The pinion and segment 208 thus move together, and the face 196 of the box 195 is brought in contact with the labels in the box 205, from which the suction created by the tube 200 takes up the topmost label, which adheres to the face 196. When the shaft 198 is rocked back, these movements are reversed. The segment 208 travels back with the pinion 214 without imparting rotation until it is arrested by the segment 206. As its further movement is then arrested it rotates the pinion 214, which continues to rotate as it passes over the segment 206. The box 195 is thus turned back with its face which carries the label presented outwardly. When the pinion passes into engagement with the segmental section 207, it carries it forward without rotation, and the face of the box is brought in contact with the pasted face of the package on the carrier 165 and places the label upon it. The segment 207 then rocks back with the pinion 214 without imparting rotation until its movement is arrested by the stationary section 206, when the movements are repeated as before. Thus the labels are taken one by one from the box 205 and deposited on the pasted packages.

As the extent of movement of the suction-box 195 is uniform, it is necessary to feed the label-holder 205 upward, so as to maintain the topmost label in proper position to be taken up by the suction-box. For this purpose I have provided the label-holder with feeding devices controlled by the operation of the other parts of the machine.

215 are arms loosely journaled on the rock-shaft 198 and supporting the label-holder 205 at their outer ends.

216 is an ear on one of the arms 215, to which is pivoted a threaded block 217, receiving the threaded end of an upright screw 218. The screw 218 is journaled in the frame 164 and carries near its lower end a pin-wheel 219.

220 is a wheel suitably mounted and driven, provided with one or more lugs or projections 221, arranged to strike the pins of the pin-wheel 219 and turn it, thereby turning the screw 218 and causing it to raise the block 217 and thereby elevate the label-holder 205.

In the drawings I have shown the wheel 220 carried on the driving-shaft 169$^a$ of the auxiliary or second labeling apparatus and driven thereby.

It is desirable that the labels in the holder 205 should be separated from one another to avoid the liability of the suction-box 195 taking up more than one label at a time. For this purpose I prefer to employ the construction which I shall now describe.

222 are the labels. At one end of the box is a facing 223, of sandpaper or of other frictional material. 224 are scrapers, preferably formed of bristles, on the other side of the box, arranged so as to act on the edges of the labels. The facing 223 and scrapers 224 act on the edges of the labels and tend to separate them. As an additional precaution a jet of air blown through a pipe 225 through an opening or openings in one side of the holder 205 may be employed. This will assist, materially, in separating the labels.

To put more or less pressure on the wrapped ends of the package and cause the paste to fasten them, the following device may be employed:

226 is a frame carried by the end of the guideway 128. (Shown fastened to the strips 128ª 128ª.)

227 are springs carried by the strips 128ᵇ, which are unconnected with the frame 226.

228 are adjusting-screws carried by the frame 226 and bearing on the spring-pieces 227. By adjusting these screws the ends of the strips 128ᵇ 128ᵇ may be forced toward each other, so as to put a slight pressure on the ends of the package. The springs 227 may be omitted, but I prefer to employ them, as they cause the ends of the strips 128ᵇ 128ᵇ to exert a yielding or spring pressure.

The operation of this apparatus is as follows: As each package falls from the open end of the guideway 128 it drops over the guide 175 upon the carrier 165 between the guides 174. It is caught by one of the projections 166 and is carried forward by the chain 165. It passes first under the pasting-roller 192, by which paste is applied to its upper face, and then below the box 195, by which the label, previously taken from the label-holder 205, is applied to the pasted face. The labeled package is then carried onward by the chain 165 and is discharged. The movements of the chain 165 are intermittent, as has been described, and each package is temporarily arrested in its movement under the labeling-arm 195 while the label is being applied.

The various power-transmitting connections and operating devices are so proportioned and timed in their relative movements that the various operations will take place in the order described.

In those cases where it is desirable to apply a second label to the other side of the package I employ a second labeling apparatus, which may be similar to the first, with intermediate devices for automatically turning the package over, so as to present the other or unlabeled side uppermost. A detailed description of these auxiliary or second labeling devices is unnecessary, as they are similar in construction and operation to those already described.

165ª is the endless chain of the second labeling device, operated by the sprocket-wheel 167ª on the shaft 169ª.

168ª is the guiding sprocket-wheel, and 170ª is the tension-wheel.

190ª is the hinged paste-pot, having its roller 192ª driven from the shaft 169ª by the gears 193ª and 194ª.

195ª is the rocking label-box, having the pinion 201ª, driven by the segment 202ª, which is operated from the segment 202 by the connecting-rod 204ª.

214ª is the pinion of the suction-box of the labeling-arm, which is actuated by the segments 206ª, 207ª, and 208ª.

200ª is the suction-pipe to the box 195ª.

205ª is the label-holder, and 218ª is the feeding-screw thereof. For operating this feeding-screw 218ª I have shown the following devices:

228 is a horizontally-reciprocating frame guided on the frame 164 of the second or auxiliary labeling apparatus, as by the pins and slots 229, and held in normal position by a spring 230.

231 is a lug or projection on the forward end of the sliding frame 228, normally in position to be struck by one of the lugs 221 of the wheel 220.

232 is a pivoted dog at the other end of the frame 228, arranged to engage successively the pins on the wheel 219ª of the screw 218ª when the slide is actuated.

The action of the successive lugs 221 of the wheel 220 on the pin 231 of the slide 228 reciprocates it and causes the dog 232 to strike the successive pins of the wheel 219ª, and thereby turn the screw 218ª. The spring 230 returns the slide after each operation.

The auxiliary or second labeling apparatus is arranged at a slightly lower elevation than the main apparatus, so that the package in passing from one to the other may have a slight fall or descent.

233 is an inclined guide between the rear end of the first labeling apparatus and the front end of the second labeling apparatus, down which the package passes when it is discharged from the chain 165. This guide is provided with an offset 234, against which the descending package strikes and is thrown over, so as to fall on the guides 173ª of the second labeling apparatus with its other side uppermost. The package thus turned over is taken by the chain 165ª, and the labeling operations are performed in the manner described. The sides of the guides adjacent to the incline 223 and offset 234 may be enlarged to form cheeks 174ª for the purpose of guiding the package and keeping it properly centered when it is turned over. The pawl-lever 179ª, which operates the ratchet 177ª of the second labeling apparatus, may be driven from the lever 179 by the connection 236.

The details of construction which have been shown are not to be taken as limitations of my invention, but may be varied in many ways without departing therefrom.

What I claim as new, and desire to secure by Letters Patent, is—

1. In a wrapping-machine, devices for folding the wrapper about the article embracing a reciprocating frame provided with a folding projection on its upper edge and folding-fingers on its ends to act upon one side of the wrapper to fold down the tops and ends, and stationary folding devices arranged to act on the other side of the wrappers when the article and its wrapper are moved forward by the reciprocating frame.

2. In a wrapping-machine, devices for folding the wrapper about the article embracing a reciprocating frame provided with a folding projection on its upper edge and folding-fingers on its ends, and a stationary plate under which the article and its wrapper are pushed by the reciprocating frame to fold down the opposite sides, and end-folders between which the article and its wrapper are pushed to fold in the ends of the wrapper on the side opposite to those folded by the folding-fingers of the reciprocating frame.

3. In a wrapping-machine, devices for folding the wrapper about the article embracing a reciprocating frame provided with a folding projection on its upper edge and folding-fingers on its end to act upon one side of the wrapper to fold down the tops and ends, stationary folding devices arranged to act on the other side of the wrapper when the article and its wrapper are moved forward by the reciprocating frame, and independent folders for folding down the ends of the wrapper at the top and bottom.

4. In a wrapping-machine, devices for folding the wrapper about the article embracing a reciprocating frame provided with a folding projection on its upper edge and folding-fingers on its end to act upon one side of the wrapper to fold down the tops and ends, a folding-plate 115 under which the article and its wrapper are pushed by the reciprocating frame to fold down the opposite side of the wrapper, and the folding-disks 119, 119 between which the article and wrapper are pushed to fold in the ends of the wrapper on the side opposite to those folded by the folding-fingers of the reciprocating frame.

5. In a wrapping-machine, folding devices embracing a reciprocating frame 51 provided with a forward projection 53 upon its upper edge and the end-folding fingers 52, 52, the auxiliary frame 54 having the folding edge 55 projecting above the projection 53, reciprocating with the frame 51, but for a less distance than said frame, and folding devices for acting on the wrapper when the article and its partially-folded wrapper are pushed forward by the frame 51.

6. In a wrapping-machine folding devices embracing a reciprocating frame 51 provided with a forward projection 53 upon its upper edge and with the end-folding fingers 52, 52 on its ends for folding in the sides of the wrapper upon the ends of the article at one side, the independent auxiliary frame 54, located in the rear of the frame 51 and having the forwardly-projecting folder 55 of a length substantially equal to the width of the wrapper, springs acting on the frame 54 to push it forward when the frame 51 is moved, and stops to limit the extent of movement of the frame 54 within the limit of the forward movement of the frame 51.

7. In a wrapping-machine folding devices embracing a reciprocating frame 51 provided with a forward projection 53 upon its upper edge and with the end-folding fingers 52, 52 on its ends for folding in the sides of the wrapper upon the ends of the articles at one side, the independent auxiliary frame 54 located in the rear of the frame 51 and having the forwardly-projecting folder 55 of a length substantially equal to the width of the wrapper, springs acting on the frame 54 to push it forward when the frame 51 is moved, stops to limit the extent of movement of the frame 54 within the limit of the forward movement of the frame 51, the folding-plate 115 under which the article and partially-folded wrapper are pushed by the frame 51, and the folders 119, 119 below the plate 115 and adjacent to its ends adapted to act on the ends of the wrapper when the article is pushed under the plate 115.

8. In a wrapping-machine, the combination of means for pushing a package with its wrapper forward, folding devices carried by said means for pushing the package forward and moving therewith, embracing mechanism for folding down one side of the wrapper and the adjacent ends thereof, a plate under which the article and its wrapper pass when thus pushed forward for folding down the opposite side of the wrapper, and end-folders between which the partially-wrapped package is pushed for folding in the adjacent ends of the wrapper.

9. In a wrapping-machine, the combination of means to push the article and its wrapper onward, means for folding upon the article the top and end folds of the wrapper upon one side, carried by said means for pushing the article and its wrapper onward and moving therewith, and a plate under which the partially-wrapped package is pushed.

10. In a wrapping-machine, the combination of a reciprocating plunger provided on its ends with pivoted gripping-jaws, trips arranged to act on said gripping-jaws and open them when the plunger descends, and folding devices for folding the wrapper about the article when it has been released by the jaws of the plunger.

11. In a wrapping-machine, the combination of a table to support the article and its wrapper, devices for partially folding the wrapper about the article when supported on the table, means to push the partially-wrapped package onward over the table, and a plate under which the partially-wrapped package is pushed for folding down the opposite side of the wrapper, and a yielding piece 43 on the table under the said plate.

12. In a wrapping-machine, the combination of a table to support the article and its wrapper, devices for partially folding the wrapper about the article when supported on the table, means to push the partially-wrapped package onward over the table, a plate under which the partially-wrapped package is pushed for folding down the opposite side of the wrapper, and means to raise and lower the table.

13. In a wrapping-machine, the combination with folding devices for partially folding the wrapper about the article, of a guideway for the wrapped packages, intermittently-actuated stops independent of the guideway for holding the partially-wrapped package over the guideway, and a reciprocating frame acting on the partially-wrapped package for pressing it into the guideway and thereby folding up the unfolded ends of the bottom of the wrapper.

14. In a wrapping-machine, the combination with folding devices for partially folding the wrapper about the article, a guideway for the wrapped packages, stops independent of the guideway for temporarily supporting the partially-wrapped packages over the guideway, folders for folding down the unfolded ends of the top of the wrapper, and a reciprocating frame acting on the partially-wrapped package to force it into the guideway and thereby fold up the unfolded end of the bottom of the wrapper.

15. In a wrapping-machine, the combination with folding devices for partially folding the wrapper about the article, of a guideway for the wrapped packages, intermittently-actuated stops for holding the partially-wrapped package over the guideway, a reciprocating frame acting on the partially-wrapped package for pressing it into the guideway and thereby folding up the unfolded ends of the bottom of the wrapper, and connecting mechanism between the reciprocating frame and the stops for holding the package over the guideway, whereby the stops are retracted to release the package when the frame descends.

16. In a wrapping-machine, the combination with folding devices for partially folding the wrapper about the article to be wrapped, a guideway for the wrapped package, the dogs 129 adapted to engage the package and hold it over the open end of the guideway, a reciprocating frame carrying a pressure-plate adapted to act on the package and force it into the guideway, and operative connections between the reciprocating frame and the dogs to operate them to release the package when the frame is depressed.

17. In a wrapping-machine, the combination with folding devices for partially folding the wrapper about the article to be wrapped, a guideway for the wrapped package, the movable dogs 129 adapted to engage the package and hold it over the open end of the guideway, arms 143 carried by the dogs 129, faces 145 on the reciprocating frame adapted to act on the arms 143 and retract the dogs when the frames are depressed, and a reciprocating frame carrying a pressure-plate adapted to act on the package and force it into the guideway.

18. In a wrapping-machine, the combination of a table over which the article to be wrapped and its wrapper are moved, means for moving the article and wrapper over the table, folding devices for folding the wrapper about the article while it is being moved over the table except at the top and bottom projecting ends, a guideway arranged transversely to the table, and a transversely-movable frame for pushing the partially-wrapped package into the guideway and thereby folding up the unfolded projecting ends of the wrapper, and folders for folding down the unfolded projecting ends of the top of the wrapper before the package is forced into the guideway.

19. In a wrapping-machine, the combination of folding devices for folding the wrapper about the article, a guideway for the wrapped package, a frame 226 carried by the guideway, springs 227 carried by strips of the guideway unconnected with the frame 226, and adjusting-screws bearing on the springs 227 to put spring-pressure on the strips of the guideway which carry said springs.

20. In a wrapping-machine, the combination with a table to support the article and its wrapper, a reciprocating frame carried by said table and guided thereon, folding devices controlled by said reciprocating frame and moving therewith for folding the top and end folds on one side of the wrapper about the article, means to push the partially-wrapped package onward upon the table, and folding devices acting upon the partially-folded package when thus pushed onward.

21. The combination of a carrier for a wrapped package, means for applying a label to the package, a second carrier for carrying the package arranged at a level below the first carrier and adapted to receive the package as it drops from the first carrier, a trip 234 between said carriers for turning the package over as it passes from one carrier to the other, and means for applying a second label to said package when it has been turned over.

22. The combination of a carrier adapted to receive and carry a package, a paste-applying device to apply paste to a face of the package while it is carried, and a label-applying device for applying a label to the pasted face, embracing a suction head or box adapted to take up and apply the label.

23. The combination of a carrier adapted to receive and carry a package, a paste-applying device to apply paste to a face of the package while it is carried, and a label-applying device for applying a label to the pasted face, embracing a rotary suction head or box, a rocking frame carrying said rotary head or box, and means to rotate said head or box when the frame is rocked.

24. The combination of a carrier adapted to receive and carry a package, a paste-applying device to apply paste to a face of the package, a rocking frame, a holder to contain labels, a rotary suction-box carried by the rocking frame, and means to rotate the suction-box during the rocking of the frame to present its face to the holder to take a label therefrom and to the package to apply it to the pasted face thereof.

25. The combination of a carrier adapted to receive and carry a package, a paste-applying device to apply paste to a face of the package, a rocking frame, a holder to contain labels, a rotary suction-box carried by the rocking frame, a pinion carried by the rotary suction-box, and a toothed segment meshing therewith to rotate the box when its frame is rocked to present the face of the box to the holder to take a label therefrom and to the package to apply it to the pasted face thereof.

26. The combination of a carrier adapted to receive and carry a package, a paste-applying device to apply paste to a face of the package, a rocking frame, a holder to contain labels, a rotary suction-box carried by the rocking frame, a pinion carried by the rotary suction-box, and a toothed segment meshing therewith and consisting of the stationary portion 206, and the movable sections 207 and 208.

27. The combination with a carrier for a package, and means to apply paste to a face thereof, of a rocking frame, a rotary suction-box carried thereby, a pinion carried by the suction-box, a stationary toothed segment 206 meshing with the pinion, the movable toothed segmental sections 207 and 208 located one on each side of the segment 206, a spring or springs to normally return the sections 207 and 208 when moved, and a label-holder, combined and operating substantially in the manner described.

28. The combination with a carrier for a package and means to apply paste to a face thereof, of a label-holder, a rocking frame, a pinion carried by the shaft thereof, a segment meshing with the pinion, a rotary suction-box carried by the rocking frame and rotated when the frame is rocked to present its face to the label-holder to take a label therefrom and to the package to apply the label to the pasted face thereof.

29. The combination with a label-holder and package-carrier, of a rocking frame, a suction-box journaled in the rocking frame and adapted to turn therein, and means to turn the suction-box in the rocking frame when the same is rocked.

30. The combination with a feeding guideway for packages, pasting and labeling devices to apply paste and labels to the package, a traveling package-carrier, guides for the package adjacent to the carrier inclined downward at their end and having their sides enlarged to form cheeks 176, the end of said guideway and its cheeks constituting a depression or pocket to receive the package.

31. The combination with a traveling package-carrier, pasting and label-applying devices, a second traveling package-carrier, pasting and label-applying devices adjacent to said second package-carrier, and a guideway adjacent to said carriers having a shoulder 234 between the said carriers by which the package is turned over.

32. The combination with a traveling package-carrier, pasting and label-applying devices, a second traveling package-carrier, pasting and label-applying devices adjacent to said second package-carrier, and a guideway adjacent to said carriers having a shoulder 234 between the said carriers by which the package is turned over, a label-holder adjacent to each of said package-carriers, means to intermittently feed each of said label-holders, and power-transmitting connections between the feeding devices of the first label-holder and those of the second.

In testimony of which invention I hereunto set my hand.

MARTIN E. BRIGHAM.

Witnesses:
 ERNEST HOWARD HUNTER,
 ROSE M. KELLY.